United States Patent [19]

De Castro

[11] Patent Number: 5,324,214
[45] Date of Patent: Jun. 28, 1994

[54] BLADE TYPE FUSE BLOCK TERMINAL ADAPTER

[75] Inventor: Andre A. De Castro, New York, N.Y.

[73] Assignee: No Jack Corporation, Uniondale, N.Y.

[21] Appl. No.: 26,585

[22] Filed: Mar. 5, 1993

[51] Int. Cl.⁵ .......................................... H01R 23/02
[52] U.S. Cl. .................................... 439/621; 439/655
[58] Field of Search ............... 439/621, 622, 638, 651, 439/655

[56] References Cited

U.S. PATENT DOCUMENTS

| D. 321,683 | 11/1991 | Marach | D13/173 |
|---|---|---|---|
| 3,671,918 | 6/1972 | Mitchell | 439/651 |
| 3,909,767 | 9/1975 | Williamson et al. | 337/264 |
| 4,604,602 | 8/1986 | Borzoni | 337/264 |
| 4,635,023 | 1/1987 | Oh | 337/163 |
| 4,661,793 | 4/1987 | Borzoni | 337/260 |
| 4,772,219 | 9/1988 | Falchetti | 439/622 |
| 4,846,733 | 7/1989 | Baisz et al. | 439/622 |
| 4,884,050 | 11/1989 | Kozel | 439/621 |
| 4,941,851 | 7/1990 | Hsueh | 439/621 |
| 4,944,697 | 7/1990 | Dorman | 439/621 |
| 4,986,767 | 1/1991 | Kozel | 439/621 |
| 5,125,855 | 6/1992 | Brooks | 439/622 |

*Primary Examiner*—Gary F. Paumen
*Attorney, Agent, or Firm*—Florence U. Reynolds

[57] ABSTRACT

An electrical adapter that includes an electrically insulated housing from which the first ends of a pair of parallel blade terminals extend to engage the contact element in a fuse block or panel in a motor vehicle where both of the parallel blade terminals are unrelated and don't come in contact with each other and were in both of the blade terminals includes a second end that is freely accessible either within, or which extend from, the housing remote from the first end thereof to permit an electrical connector of an auxiliary device to be selectively engagable therewith.

11 Claims, 2 Drawing Sheets

BLADE TYPE FUSE BLOCK TERMINAL ADAPTER

BACKGROUND OF THE INVENTION

1. Field of the Invention

This is an invention directed to blade type fuse blocks found in motor vehicles and is specifically an electrical adapter to provide an electrical connection to a fuse block terminal with the intent of facilitating the connection of a remote device which could be used to interrupt, monitor or draw electrical power from a particular circuit in a fuse block. This is accomplished by removing the protecting blade type fuse from its terminal socket in the fuse block and placing the blade type fuse block terminal adapter in its place and connecting a desired device to the adapter. The device could then be used to accomplish one or more of the above mentioned applications. A protective fuse or fuse-like system would have to be housed in the connected device or somewhere else in the circuit to protect against electrical irregularities.

In one form of this invention both of the blade terminals on the adapter extend past the housing so that an electrical connection can be made with a pair of female connectors mounted onto or connected by an electrical wire or cable associated with the monitoring device or auxiliary equipment being installed. In this form of the invention the blade terminals that would be exposed for connection with an auxiliary device, could be protected against arcing or accidental grounding by selectively covering with a protective insulated cap when not being used.

In a second form of this invention the secondary ends of both blade terminals would be mounted within a recessed cavity in the housing of the adapter having a recess of a size to permit two female connectors to be inserted therein to make electrical contact with the secondary ends of the blade terminals.

2. Description of the Prior Art

The automotive as well as other industries have uniformly begun to utilize blade type fuses and fuse blocks that reduce the complexity and problems associated with replacing, as well as monitoring glass cylindrical type fuses, traditionally used in protecting against electrical overloads and overheating in low amperage electrical wiring. The now widely used blade type fuse blocks have economized space due to the compact design of the blade fuses. This fuse housing design enables ease of manipulation and verification of failed fuses in conditions of overloaded or overheated wiring. Examples of blade type fuses and fuse blocks are disclosed in U.S. Pat. No. 3,909,767 and U.S. Pat. No. D,321,683.

In related inventions U.S. Pat. Nos. 4,884,050 and 4,986,767 to Emmett L. Kozel the issues of fuse element monitoring as well as ease of installation of auxiliary devices were addressed with the blade terminal tap fuse invention and the blade type fuse power tap. The first invention U.S. Pat. No. 4,884,050 of 1989 used one or both blade elements that protruded through the housing (identical in performance as well as appearance) allowing an electrical connection to an auxiliary device. This connection permitted a remote device to monitor the fuse element for a failed condition due to an overload in the circuit. It also enabled the quick tapping of electrical power through the same protruding blade elements mentioned above. The later invention U.S. Pat. No. 4,986,767 also made it possible to tap electrical power as well as monitor a blade type fuse element, only this time reproducing a fuse-like housing and replacing a fuse in the fuse block with it was no longer necessary. Instead a smaller and less involved tapping apparatus which could connect directly to the top of an existing fuse was used.

The inventions did simplify both tapping electrical power from a motor vehicle electrical system, as well as enabling remote monitoring of the condition of a fuse element. Unfortunately both of the above-mentioned inventions are limited by the use of a fuse they incorporate during operation. The use of fuse housing which contains an amperage-sensitive element linking the blade terminals, makes it impossible or unnecessary in applications where the working of a fuse interferes with the intent to interrupt a particular electrical circuit by placing a device between such circuit and it's fuse. In addition, if a special terminal was to be provided for the purposes of monitoring one or more of the electrical systems for such occurrences as voltage irregularities or strictly tapping electrical power, a fuse-like housing would not be needed but instead an adapter with no fuse element would suffice.

SUMMARY OF THE INVENTION

The blade type fuse block terminal adapter according to the invention has a fuse-like housing for adaptation in place of a fuse in the fuse block terminal but has no amperage-sensitive link between the blade terminals. This enables the above-mentioned adapter to perform this inventions preferred application of the invention, which is to permit the connection of a circuit-interrupting device such as a motor vehicle security system, between the circuit and it's fuse. In a preferred embodiment, the adapter features a 90 degree angle design that enables the upper portion of the housing to be inserted into a blade terminal with great ease as well as permitting the closing of the fuse box lid.

This invention employs a blade type fuse block having terminals with female electrical sockets to engage a pair of parallel and generally coplanar blade terminal elements that are mounted within an insulated solid voidless housing and which are not connected in such housing. Each of the blade elements includes a first end that extends outwardly from the housing to provide for electrical contact with the female terminal sockets of the fuse block.

In the first embodiment of the invention, the secondary ends that extend away from the primary ends intended to connect with the terminals of the fuse block, are spaced from the surrounding housing to provide two tappable male connectors that can then assist in intruding in an electrical circuit between the system and its protecting fuse, or as a way to draw electrical power from the motor vehicle's fuse block. When said secondary ends are not in use, an insulated cover may be placed over the blade terminals to insure that no accidental grounding occurs.

In the second embodiment of the invention both secondary ends of the blade terminals are recessed within the adapter's housing with a bore being provided around the secondary blade terminal ends so that female electrical connectors may be inserted within the space in a surrounding relationship with the blade terminals. Again, to prevent any accidental grounding of the secondary blade terminals, a plug may be inserted within the recess created in the housing when the secondary blade terminals are not in use.

In a third form of the original invention both the first and second embodiment mentioned above would be selectively employed in the manufacturing of a blade type fuse block terminal adapter where the housing and blade terminals are of the style and size of the MINI fuse type fuse (U.S. Pat. Nos. 4,661,793, and 4,604,602). Such fuses are gaining in popularity due to their smaller design enabling the placement of more fuses in the same space as previous fuses. All of the functions and intents of the original invention remain the same.

In a fourth form of the original invention both the first and second embodiments mentioned above would be selectively employed in the manufacturing of a blade type fuse block terminal adapter where the housing and blade terminals are of the style and size of the MAXI fuse type fuse (U.S. Pat. Nos. 4,635,023, and 4,604,602). Such fuses are gaining in popularity due to their larger design enabling the protection of more systems generating higher current loads on one fuse as well as large systems which were once unable to be protected by blade type fuses.

DESCRIPTION OF THE PREFERRED EMBODIMENTS

Figure 1:
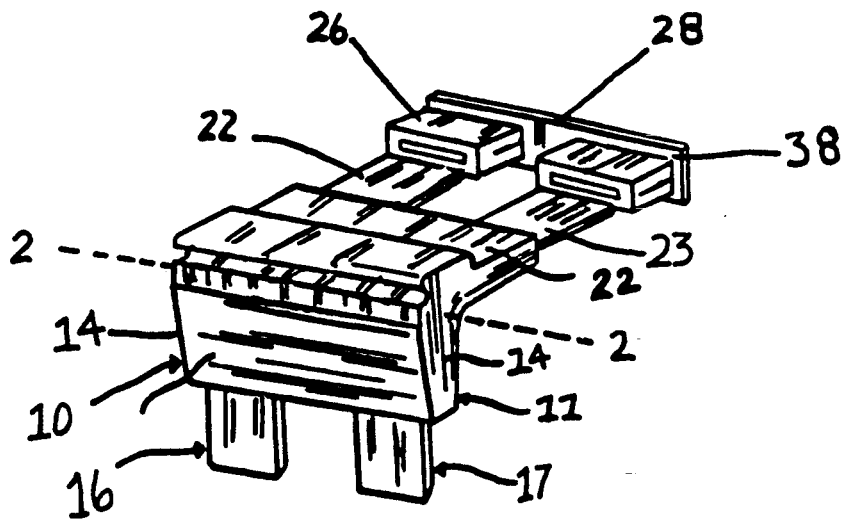
FIG. 1 is a perspective view of the first embodiment of the present invention showing an electrically insulated cap for covering the secondary terminals of the adapter when not in use.
Figure 2:
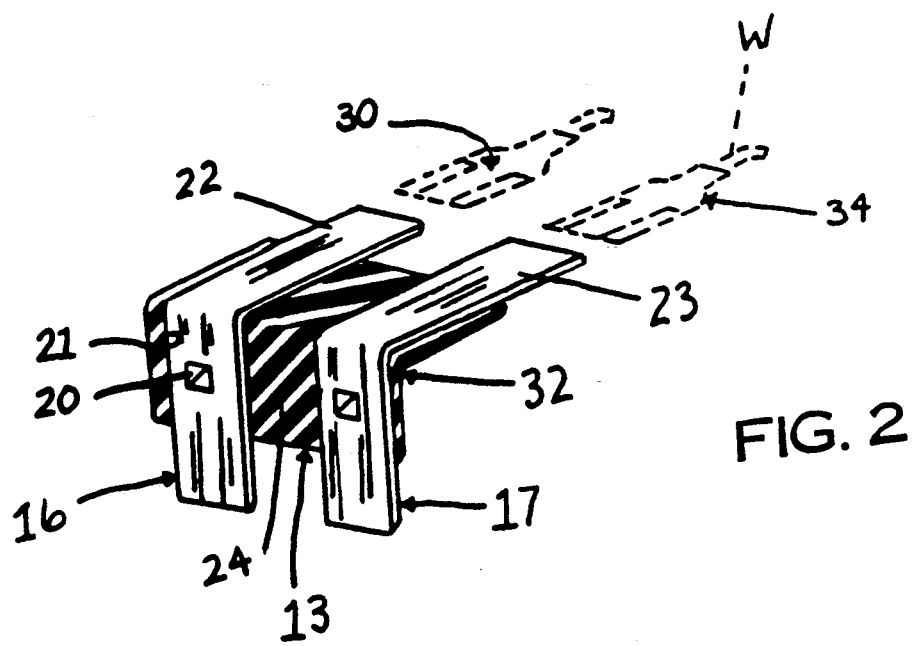
FIG. 2 is a cross sectional view taken through lines 2—2 of FIG. 1 and showing in dotted lines two electrical connectors being brought in overlapping relationship with respect to the secondary terminals of the adapter.

With continued reference to the drawing FIGS. 1 and 2 show a first embodiment of the present invention. In this embodiment, the fuse block adapter is designed to provide a quick connection for an auxiliary electrical line or wire W such as shown in dotted lines in FIG. 2. The wire may extend to an electrical component or unit which is to be connected to the electrical system.

As previously discussed it is the primary intent of the present invention to provide a means to interrupt electrical power to a particular system by coming between the blade type fuse block terminal and the fuse used to protect that automotive system. The actual interrupting of the electrical circuit is accomplished with a remote device, and the adapter only assists such a device in the electrical connection procedure that would otherwise be complicated and time consuming utilizing splicing wiring and using harnesses. When it is desired to install an auxiliary electrical component such as a telephone or radio in a car, it is necessary to connect such components directly to the vehicle's electrical system. By utilizing the fuse block adapter shown in FIGS. 1 and 2, it is possible to accomplish the connection directly through the fuse block terminals in the cars. In this embodiment the adapter 10 includes an insulated plastic body portion 11, having an upper end 12, a lower end 13, side walls 14, front and rear walls 15. The housing 11 is formed of a suitable electrically insulated plastic material which may be molded about the remaining electrical components of the adapter. Such plastic materials are fire resistant and may include nylon, polystryenes and the like.

The blade type fuse block terminal adapter includes a pair of electrically conductive blade elements 16 and 17 that are designed to be engaged within a female terminal in a fuse block or panel (not shown). Each of the blade elements 16 and 17 includes an opening generally indicated at 20. When the adapter is formed the plastic material forming the housing 24 is forced through the openings 20 during molding, thereby securing the blade elements 16 and 17 to the housing 24. The blade element 16 is shown as extending through a channel 21 having openings along the upper and lower surfaces of the housing. The blade elements 16 and 17 include upper extending secondary end portions 22 and 23 which are designed to provide an electrical tap for the electrical wire W.

The secondary ends 22 and 23 of the blade terminals 16 and 17 extend over and beyond the upper half of the housing 24 that forms a 90 degree angle 32 at the center as part of the adapter design.

The two blade elements 16 and 17 are separated by an electrically insulated wall 24 which is provided to prevent any arcing between the blade elements.

When the adapter 10 of the present invention is not in use, a separate electrically insulated cover or cap 26 is provided which fits over and closely engages the secondary portions 22 and 23 of the blade elements 16 and 17. The cover or cap 26 includes a main body portion 38 having an opening which is of a size to cooperatively receive the secondary ends 22 and 23 of blade elements 16 and 17. The body portion 38 also engages the upper end 12 of the fuse block adapter when placed over the secondary blade elements 22 and 23. The cover further includes an outwardly extending flange 28 which may be engaged by a screw driver or a finger nail to lift the cover from the blade elements 22 and 23.

With the cover removed the blade type fuse block terminal adapter the present invention is ready to be utilized to provide a source into the electrical circuit between the fuse block terminal and the fuse it replaces. Once connected the fuse block adapter allows a circuit interruption device to be electrically connected to it through the secondary blade terminal ends. The device connected to the fuse block adapter may also act as an electrical voltage monitor or simply be tapping or sharing electrical power from such circuit.

As shown in FIG. 2 the crimpable connector elements 30 and 34 are attached to the free ends of the electrical wires W. By placing the crimpable connectors on the secondary ends 22 and 23 of the blade elements 16 and 17, an electrical contact is established through the electrical wires W to a remote electrical device (not shown).

Figure 3:
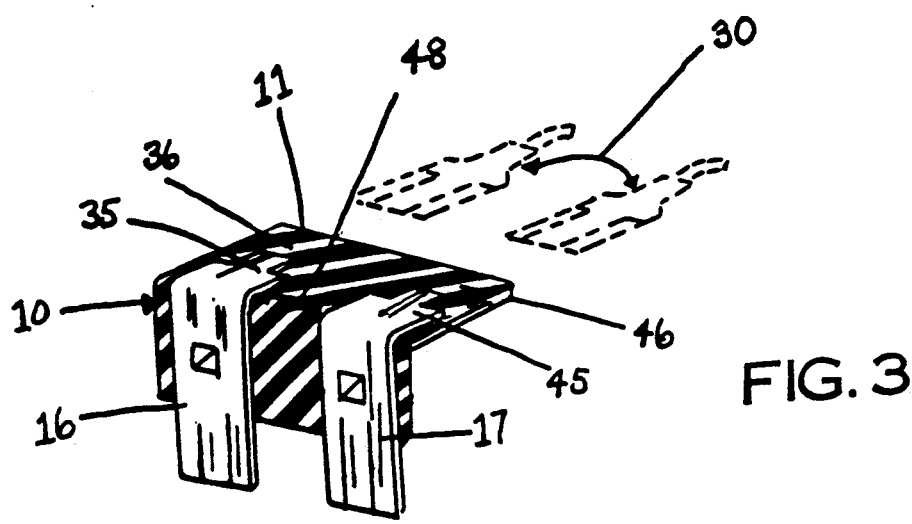
FIG. 3 is a cross sectional view similar to that of FIG. 1 taken through an alternative embodiment of the present invention where the secondary terminals are oriented within the adapter housing and shown in dotted lines are two auxiliary connectors being brought into aligned relationship to make the electrical connection.
Figure 4:
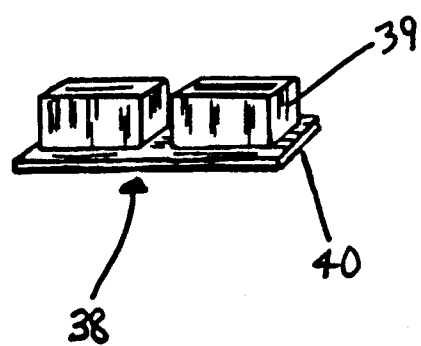
FIG. 4 is a perspective view of an insulated cap which fits into the opening of the adapter of FIG. 3 to electrically insulate the secondary terminals when not in use.

With specific reference to FIG. 3 a second embodiment of the invention is disclosed. In this form the blade type fuse block terminal adapter 10 includes a housing 11 which is substantially identical to the housing shown and discussed above with respect to the embodiment of FIGS. 1 and 2. The only difference between the two housings is that the channel 48 (not illustrated) in which the secondary ends 22 and 23 of the blade elements 16 and 17 are located, includes bores 36 and 46 (not illustrated) along the uppermost end of the housing 11 after it angles 90 degrees. The bores 36 and 46 (not illustrated) are of a size to permit a female electrical connector 30 to be inserted therein to contact the secondary ends of the blade terminals 35 and 45.

The blade contact elements 16 and 17 of the present embodiment also include two upper secondary ends 35 and 45 that are spaced inwardly of the housing to be positioned totally within the bores 36 and 46 (not illustrated). In this manner secondary contact elements 35 and 45 are positioned entirely within the electrically insulated housing.

When electrical contact is desired the female electrical connectors are inserted within the bores in the housing as opposed to being inserted over the contact element outside of the housing, as was the case with the prior embodiment.

When the electrical contact elements 35 and 45 are not in use an electrically insulated cover or cap 38 is provided which includes two rectilinear sleeves 39 of a size to fit over the electrical contact elements 35 and 45 and cooperatively seated within the bores 36 and 46 (not illustrated). The cover 38 includes an outwardly extending flange portion 40 that provides a gripping surface for removing the cover from the contact elements 35 and 45.

The blade type fuse block terminal adaptor of the present invention is utilized in place of a blade fuse. The adapter is installed in the same manner as a blade fuse. However when connected it does not perform the function of a fuse, but is only a way to quickly enable tapping into an electrical circuit with the goals of interrupting such circuit, tapping electrical power from such circuit or monitoring electricity in such circuit by then allowing connection by the appropriate device. The installed device must then protect the circuit with a fuse or fuse-like system. In the event that a manufacturer provides an additional dedicated terminal socket in its fuse block, the above mentioned invention can then be that terminal's link to an electrical device or monitoring devices which no longer need to be professionally wired in.

I claim:

1. An electrical blade type adapter for insertion into a fuse block adapted to receive a blade type fuse, comprising an electrically insulated plastic material forming a solid voidless housing block, and a pair of unconnected, spaced, substantially parallel, electrically conducting blade type elements embedded in said housing block, each of said elements having (1) a first flat male end extending outwardly from said housing block and shaped to fit into a female terminal socket in said fuse block which normally receives a blade of a blade type fuse and (2) a second flat male end adapted to fit a terminal of an auxiliary electrical device, wherein said plastic material completely fills the space between said elements within the housing.

2. The adapter as claimed in claim 1, wherein said second ends lie in respective bores in said housing block.

3. The adapter as claimed in claim 1, wherein said housing is molded around said elements.

4. The adapter as claimed in claim 1, wherein said housing and said blade elements bend in the center to form a 90 degree angle.

5. The adapter as claimed in claim 1, further comprising an electrically insulated cap adapted to enclose said secondary ends of said blade elements when said ends are not in use.

6. The adapter as claimed in claim 1, wherein the housing and blade elements are of the MINI fuse type.

7. The adapter as claimed in claim 1, wherein the housing and blade elements are of the MAXI fuse type.

8. In a motor vehicle electrical system having a fuse block adapted to receive a blade type fuse and an adapter inserted in said fuse block for connecting an auxiliary electrical device into said electrical system, the improvement wherein said adapter comprises an electrically insulated plastic material forming a solid voidless housing block and a pair of unconnected, spaced, substantially parallel, electrically conducting blade type elements embedded in said plastic material, each of said blade type elements having a first end extending outwardly from said housing block into said fuse block and having a second end connected to said auxiliary electrical device, thereby providing a source of power to said auxiliary electrical device and wherein said electrical system includes a fuse external to the adapter to protect said electrical system from a current overload.

9. The electrical system as claimed in claim 8, wherein said auxiliary device is a motor vehicle security system.

10. The electrical system as claimed in claim 8, wherein said auxiliary device is a radio.

11. The electrical system as claimed in claim 8, wherein said auxiliary device is a telephone.

* * * * *